July 12, 1949.  H. C. RIEMANN  2,475,858
STEERING WHEEL SPINNER KNOB
Filed April 4, 1947
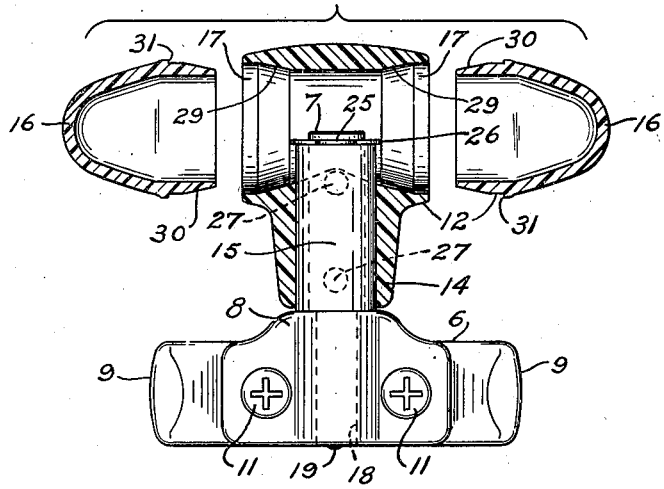
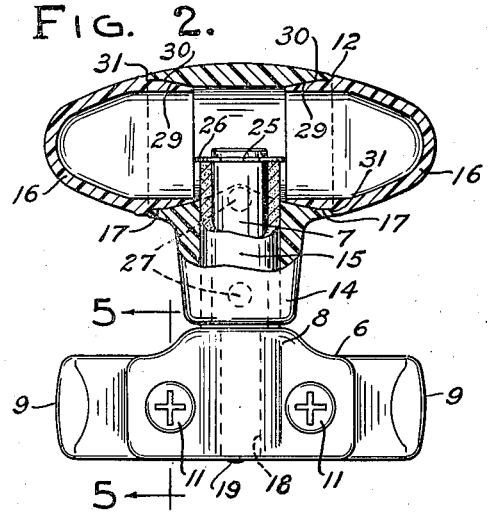
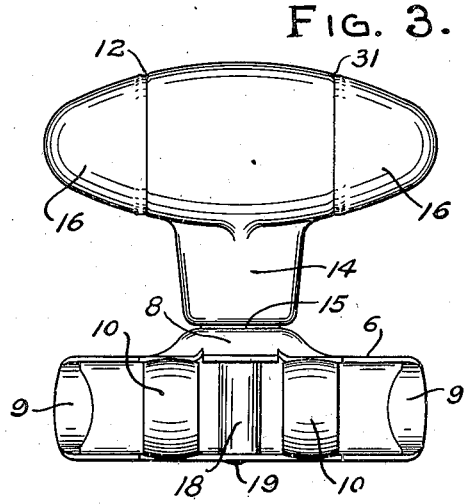
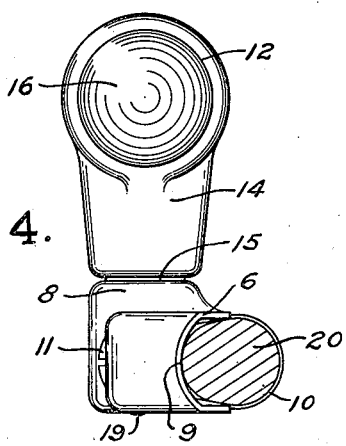
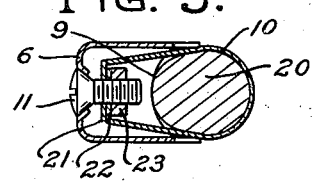
INVENTOR.
H. C. Riemann
BY
Lieber & Lieber
ATTORNEYS Patented July 12, 1949

2,475,858

UNITED STATES PATENT OFFICE 2,475,858

STEERING WHEEL SPINNER KNOB

Howard C. Riemann, West Allis, Wis., assignor to The Fulton Company, West Allis, Wis., a corporation of Wisconsin Application April 4, 1947, Serial No. 739,275

4 Claims. (Cl. 74—557)

My present invention relates in general to improvements in devices for facilitating controlled guidance of vehicles of various types, and relates more particularly to improvements in the construction of vehicle steering wheel spinner knobs or the like.

The primary object of the present invention is to provide an improved spinner knob assemblage for vehicle steering wheels or the like, which is simple and durable in construction and efficient in operation.

Various styles of so-called spinner knobs adapted to be applied to the steering wheels of automobiles and other vehicles, in order to facilitate rapid rotation of these steering wheels while controlling the direction of travel of the vehicles, have heretofore been utilized quite extensively. Among these prior devices there are some having gripping knobs of approximately circular formation, while others are T-shaped in order to afford more positive gripping and to prevent slippage, and in practically all of the modern assemblages the knobs are formed of attractive plastic molded into ornamental shapes. Most of these plastic gripping knobs consist of a lower or hub section having a journal bearing confined therein for coaction with a pivot post adapted to be secured to the steering wheel rim, and an upper or closure section cemented to the top of the hub section along a horizontal joint, after the bearing in the lower section has been properly assembled and attached to the upper extremity of the post through the open upper end of the hub section. While this mode of constructing and uniting the knob sections greatly facilitates assembly of the spinner units, it has been found difficult to prevent off-setting of the joints when applying elongated elliptical closure sections to the similarly formed tops of the hub sections of the T-shaped knobs, unless great care was exercised and considerable time was devoted to the task.

It is therefore a more specific object of my present invention to provide an improved T-shaped sectional spinner knob the interior of which is conveniently accessible for facilitating assembly of the bearing and pivot post, and wherein the sections are adapted to be quickly and firmly united to produce a smooth and highly finished final appearance.

Another object of this invention is to provide an improved spinner knob assemblage embodying a T-shaped gripping knob, which is simple and durable in construction, and which may also be manufactured at moderate cost.

Still another object of the invention is to provide an improved steering wheel spinning accessory, which may be constructed with different sections thereof ornamentally colored so as to present an aesthetic appearance, and in which off-setting of the coacting sections during final assembly is definitely avoided.

These and other objects and advantages of the improvement will be apparent from the following detailed description.

A clear conception of the features constituting the present invention, and of the mode of constructing and of assembling the parts of the improved spinner knob unit, may be had by referring to the drawing accompanying and forming a part of this specification wherein like reference characters designate the same or similar parts in the various views.

Fig. 1 is a part sectional front elevation of a typical steering wheel spinner unit embodying the invention showing an exploded view of the T-shaped gripping knob;

Fig. 2 is a similar view of the same unit, but showing the sections of the T-shaped knob finally assembled and united;

Fig. 3 is a rear elevation of the same steering wheel spinner unit fully assembled;

Fig. 4 is a side view of the same unit also fully assembled; and

Fig. 5 is a transverse section through the mounting base or bracket and one of the clamping straps, the section having been taken along the line 5—5 of Fig. 2.

Although the invention has been shown and described herein as being advantageously applicable to spinner knob units especially adapted for attachment as accessories to the rims of the steering wheels of automobiles or the like, it is not my desire or intention to unnecessarily limit the utility of the improvement by virtue of this restricted disclosure.

Referring to the drawing, the typical steering wheel spinner unit shown therein by way of illustration, comprises in general a mounting base or supporting bracket 6 having a pivot spindle or stub shaft 7 firmly secured to its medial portion 8, and being provided on opposite ends thereof remote from the shaft 7 with a pair of steering wheel rim gripping pads 9; a rim clamping strap 10 associated with the bracket 6 between each of the pads 9 and the central shaft 7 and each having a fastening screw 11 coacting therewith; and a T-shaped gripping knob 12 having a central hub section 14 provided with a central bearing bushing or sleeve 15 journalled for free rotation upon the shaft 7, and also having two oppositely directed similar ovoid sections 16 cooperable with openings 17 in the opposite sides of the uppermost portion of the hub section 14 to enclose the space at the upper ends of the shaft 7 and bearing sleeve 15.

The main mounting base or supporting bracket 6 is formed of sheet metal and the pivot shaft 7 has an integral lower portion 18 of reduced diameter which snugly fits alined holes in the medial bracket portion 8 and is firmly secured to the bottom plate of the bracket 6 by a spot weld 19, or other suitable fastening means. The end pads 9 are formed integral with the bracket portion 8 and are adapted to clampingly engage one side of the rim 20 or of a spoke of the steering wheel at remotely spaced points or zones, while the resilient sheet metal straps 10 engage the opposite side of the rim or spoke between these zones. Each of the straps 10 has overlapped outer and inner ends 21, 22 respectively, provided with alined openings through which the attaching screws 11 extend; and the heads of these screws 11 coact with the base bracket 6 while the threaded shanks thereof coact with nuts 23 secured to the inner strap ends 22, as clearly shown in Fig. 5. When the screws 11 are tightened, they draw the straps 10 and the pads 9 into firm clamping engagement with the intervening steering wheel rim 20 or spoke, in an obvious manner.

The upper end of the stub shaft 7 is provided with an annular groove or recess 25 and the bearing sleeve 15 which is preferably formed of compressed powdered iron or the like, extends from the top of the medial bracket portion 8 to the lower plane of the shaft recess 25. The sleeve 15 snugly but rotatably embraces the cylindrical portion of the shaft 7 between the supporting portion 18 and the recess 25, and this bushing sleeve 15 is held in position upon the pivot shaft 7 by a U-shaped leaf spring or resilient clip 26 sprung laterally into the recess 25. The bearing sleeve 15 is sufficiently porous to retain lubricant for a long period of time, and is also provided with external anchoring pockets or projections 27 for holding the bushing firmly within the hub section 14 of the T-shaped gripping knob 12.

As previously indicated, the gripping knob sections 14, 16 of the T-shaped knob 12 may be formed of durable and ornamental plastic or other suitable material, and the lower hub portion of the central knob section 14 may be cast about and pressed against the bearing sleeve 15 so that the lugs 27 are embedded within the hub and will positively prevent relative displacement of the coacting parts. The upper portion of the central section 14 of the knob 12 is hollow and is provided with alined annular tapered internal surfaces 29 adjoining the openings 17 therein, and the stub shaft 7 and bearing sleeve 15 project into this hollow portion or space, so that the recess 25 and the clip 26 which are normally confined in this space are freely accessible for assembly or dismantling through the large openings 17. The ovoid shaped closure sections 16 of the T-shaped knob 12 are provided with annular similarly tapered external surfaces 30 terminating in transverse annular abutment surfaces 31, and these tapered closure section surfaces are adapted to snugly coact with the internal tapered surfaces of the hub section 14 when the abutment surfaces are in engagement with the outer ends of the openings 17.

When the several parts of the improved steering wheel spinner unit have been properly constructed as above described, the knob supporting pivot shaft 7 of each assemblage may be rigidly attached to the main bracket 6 by applying a weld 19 or otherwise, after which the bearing sleeve 15 of a knob hub section 14 may be slipped over the upper shaft end so as to position both the top of the bearing and the upper end of the shaft within the hollow loop at the top of the section 14. The shaft 7 and bearing sleeve 15 may then be finally assembled by inserting one of the U-shaped spring clips 26 within the upper shaft recess 25 through the large openings 17 as will be clearly apparent from Fig. 1. Cement or other suitable adhesive may then be applied to the tapered surfaces 29, 30 of the knob sections 14, 16 respectively, whereupon the cap or closure sections 16 may be applied as illustrated in Figs. 2 and 3 with the cap abutment surfaces 31 in snug engagement with the opposite ends of the loop of the medial section 14.

In order to apply one of the improved spinner units to a steering wheel rim 20, the clamping straps 10 should be positioned about the rim with their ends 21, 22 overlapped and the nuts 23 secured to the inner ends 22, before the screws 11 have been applied. The screws 11 may subsequently be loosely applied to the strap ends and nuts 23 as depicted in Fig. 5, after which the bracket 6 may be properly positioned relative to the rim 20 and the screws 11 should be tightened to cause the straps 10 and the bracket pads 9 to firmly clamp the spinner assembly to the steering wheel. The improved assemblage may obviously be applied either to the steering wheel rim 20, or to a spoke of the wheel, and the porous bearing sleeve 15 should preferably be lubricated before assembly is completed. The T-shaped knob 12 will subsequently provide an effective easily graspable grip for manipulating the steering wheel as when backing into and when pulling out of cramped parking spaces.

It should be understood that it is not desired to limit this invention to the exact details of construction herein shown and described, for various modifications within the scope of the appended claims may occur to persons familiar with the art; and it is also contemplated that specific descriptive terms employed herein be given the broadest possible interpretation consistent with the disclosure.

I claim:

1. A steering wheel spinner unit comprising, a mounting bracket having a stub shaft projecting therefrom, a T-shaped gripping knob having a hub section journalled for rotation upon said shaft and provided with an integral loop-shaped portion remote from said bracket and having alined openings on the opposite sides thereof for gaining free access to the adjacent end of said shaft, and means accessible only through said openings for attaching said hub to said shaft, said knob also having closure sections extending into and normally sealing said openings.

2. In a steering wheel spinner unit, a supporting bracket having a pivot shaft projecting therefrom, a knob section having a hub journalled for rotation upon said shaft and also having an integral hollow portion adjacent to the free end of the shaft provided with a pair of alined lateral openings, means accessible only through said openings for attaching said hub section to said shaft within said hollow portion, and a closure section for each of said openings, each of said closure sections being provided with a tapered end portion snugly cooperable with a similarly formed internal surface of said hollow hub section.

3. In a steering wheel spinner unit, a supporting bracket having a pivot shaft projecting therefrom and provided with an annular recess near its free end, a knob section having a hub journalled for rotation upon said shaft and also having an integral loop portion providing lateral openings at said shaft end recess, a spring clip coacting with said recess and said hub to retain said knob section upon said shaft, said clip being freely accessible only through said openings, and a closure section secured to said knob section at each of said openings.

4. In a steering wheel spinner unit, a supporting bracket having a pivot shaft projecting therefrom and provided with an annular recess near its free end, a knob section having a hub journalled for rotation upon said shaft and also having an integral loop portion providing lateral openings at said shaft end recess, a spring clip coacting with said recess and said hub to retain said knob section upon said shaft, said clip being freely accessible only through said openings, and a closure section secured to said knob section at each of said openings, each of said closure sections having a tapered surface coacting with and cemented to a correspondingly tapered inner surface of the loop.

HOWARD C. RIEMANN.

REFERENCES CITED

The following references are of record in the file of this patent:

UNITED STATES PATENTS

| Number | Name | Date |
|---|---|---|
| D. 141,293 | Thorp | May 22, 1945 |
| 1,055,646 | Mossberg | Mar. 11, 1913 |
| 2,123,811 | Sinko | July 12, 1938 |